(12) United States Patent
Ljung et al.

(10) Patent No.: US 8,874,714 B2
(45) Date of Patent: Oct. 28, 2014

(54) METHOD FOR RETRIEVING THE IMPLEMENTED DATA MODEL FROM A DEVICE

(75) Inventors: Magnus Ljung, Nättraby (SE); David Möllersten, Karlskrona (SE); David Gustafsson, Lyckeby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 627 days.

(21) Appl. No.: 13/085,581

(22) Filed: Apr. 13, 2011

(65) Prior Publication Data

US 2012/0198052 A1 Aug. 2, 2012

Related U.S. Application Data

(60) Provisional application No. 61/436,669, filed on Jan. 27, 2011.

(51) Int. Cl.
*G06F 15/177* (2006.01)
*H04L 12/24* (2006.01)

(52) U.S. Cl.
CPC ........... *H04L 41/145* (2013.01); *H04L 41/0213* (2013.01); *H04L 41/0859* (2013.01)
USPC ........... 709/223; 709/217; 709/228; 709/220; 719/330

(58) Field of Classification Search
USPC ............ 709/217–224; 370/216, 252; 719/330
See application file for complete search history.

(56) References Cited

U.S. PATENT DOCUMENTS

| | | | | |
|---|---|---|---|---|
| 8,116,221 B2 * | 2/2012 | Wu | ............... | 370/252 |
| 8,326,953 B2 * | 12/2012 | Jin | ............... | 709/220 |
| 2008/0235254 A1 * | 9/2008 | Chang et al. | ............... | 707/100 |
| 2011/0228665 A1 * | 9/2011 | Kumar et al. | ............... | 370/216 |
| 2012/0047521 A1 * | 2/2012 | Huang et al. | ............... | 719/330 |
| 2012/0054326 A1 * | 3/2012 | Royon et al. | ............... | 709/223 |

* cited by examiner

*Primary Examiner* — Abdullahi Salad
(74) *Attorney, Agent, or Firm* — Patent Portfolio Builders PLLC (57) ABSTRACT

Presented is an apparatus and methods for collecting the implemented data model and version information from an end user device. The apparatus is communicatively connected to the end user device and uses, for example, the Broadband Forum TR-069 protocol or another protocol for communications. The method interrogates the end user device to determine all parameters and their data types by traversing the end user device's data model level by level and instantiating any objects discovered that are instantiable but not yet instantiated. The method archives the data model and end user device version information for later use with like devices.

15 Claims, 8 Drawing Sheets

METHOD FOR RETRIEVING THE IMPLEMENTED DATA MODEL FROM A DEVICE

RELATED APPLICATION

This application is related to, and claims priority from, Provisional Application No. 61/436,669, filed on Jan. 27, 2011, entitled "Method for Retrieving the Implemented Data Model from a Device" to Magnus LJUNG et al., the entire disclosure of which is incorporated here by reference.

TECHNICAL FIELD

The present invention relates generally to end user device management systems and more specifically to configuring an end user device management system for different vendor end user devices and software versions.

BACKGROUND

The number of end user devices such as set-top boxes, DSL modems, gateways, etc. has greatly increased over the last few years. In response to this growth of end user devices in the marketplace, the Broadband Forum has defined a standard for managing these types of devices. The standard is referred to as TR-069 or CWMP and is incorporated herein by reference. Included in the standard are a number of technical reports, specifying data models available for the end user devices. The data models specify objects available to the end user device, the parameters associated with the objects and other information such as an indication whether the parameters are available for change through a communication link.

The Broadband forum provides schema and definition files for each data model allowing an end user device management system to import the data model files and manage the device. As the market for end user devices has evolved, most vendors have extended the data models provided by the Broadband Forum to include vendor specific objects and parameters to provide distinctive features for the vendor's products. The extension of the standard data models with vendor specific objects and parameters has proven problematic to end user device management systems. In one example of the associated problems, many vendors do not provide a data model definition in a standard format that an end user device management system can import or if a data model is provided, it typically is out of date with the objects and/or parameters implemented in the end user device. In another example, although a particular vendor may provide up-to-date data model files for the current version of their software, they do not provide data model files for previous versions of their software.

The result of this evolution is that users of an end user device management system must manually define the vendor extensions in the end user device management system or encourage each vendor to release data model files, including the vendor's extensions, for each version of the vendor's software released to the market. Consequently, market pressure is building for a mechanism allowing reliable and version complete support of end user device data models in an end user device management system without any error prone manual data entry.

SUMMARY

Apparatus and methods address the market needs described above by providing an automatic generation of the data model, including the vendor extensions, for end user devices. The end user device management system communicates with an end user device currently configured with the software version and data model of interest. As a part of this communication, the end user device management system extracts the implemented data model, including the vendor extensions, from the end user device. The end user device management system stores the data model and information describing the end user device and the software version as metadata for use with future end user devices executing this version of the vendor's software.

In one exemplary method embodiment, the end user device management system establishes a communication link to an end user device of interest. In another aspect of the exemplary method embodiment, the end user device management system downloads the end user device information from the end user device. In the exemplary method embodiment, the end user device information comprises parameter names, parameter data types, multi-instance objects, and information associated with each parameter indicating whether each parameter is writeable. Continuing with the exemplary method embodiment, the end user device management system processes the end user device information to determine if there are any objects that require instantiation and requests the end user device to instantiate those objects. The exemplary method embodiment, after completing the interrogation and processing, archives the data model and version information to a data storage device.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
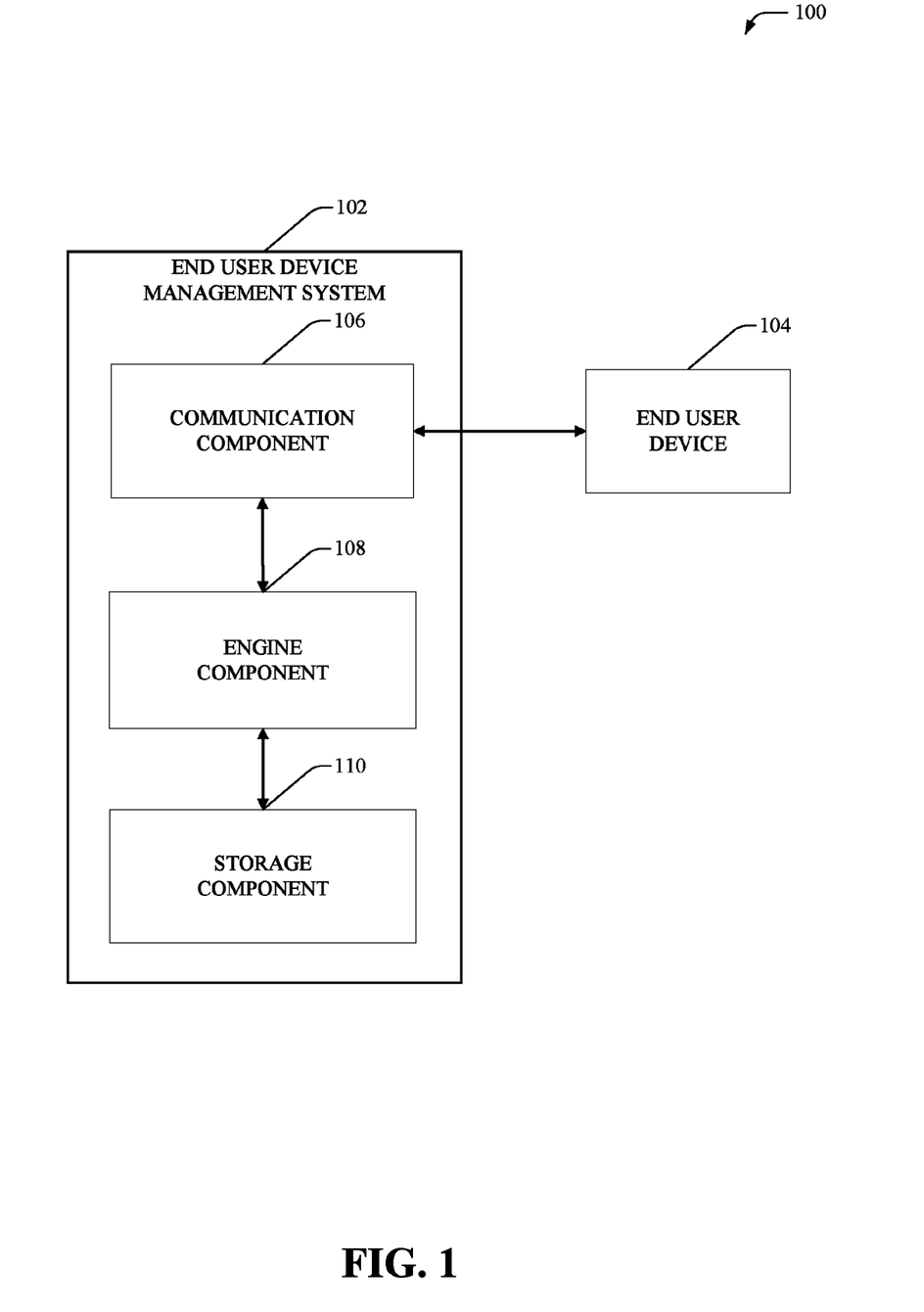
FIG. 1 depicts an end user device management system for downloading data model and version information from an end user device for use in managing other like end user devices, including a communication component, an engine component and a storage component.

Looking first to FIG. 1, a diagram 100 of an exemplary embodiment of an end user device management system 102 for collecting and archiving end user device 104 data model and version information is illustrated. The exemplary embodiment of the end user device management system 102 includes but is not limited to an exemplary end user device 104, an exemplary communication component 106, an exemplary engine component 108 and an exemplary storage component 110. It should be noted in this exemplary embodiment that the end user device 104 can be a single model from a manufacturer running different software versions implementing different data models or different manufacturers and/or models implementing different data models. Further, it should be noted in the exemplary embodiment that as referenced in this document, software associated with the end user device 104 includes firmware, operating system and application software, each having an associated version number. Accordingly, the exemplary embodiment discussion of extracting and storing a software version number can include more than one version number as associated with different software operating on the end user device 104 or a combination of version numbers to represent a specific data model extracted from the end user device and available for use on similarly configured end user devices 104. In another aspect of the exemplary embodiment, the data model extracted from the end user device 104 can be segmented based on the software versions of the different software operating the device and allow for a data model to be constructed for a like device based on the component software versions.

In one aspect of the exemplary embodiment, the end user device 104 is any device capable of responding to a request for data model and version information. Examples of end user devices include but are not limited to television set-top boxes, DSL modems, cable modems, gateways and the like. In another aspect of the exemplary embodiment, the end user device 104 can accept a request from an end user device management system 102 to open a connection and respond by establishing the connection, accept a request from the end user device management system 102 for the supported capabilities of the end user device's 104 interface and respond with a list of supported functions, accept a request from the end user device management system 102 for data value identifiers and respond by providing a list of data value identifier names, accept a request from the end user device management system 102 to instantiate objects associated with the data model and respond by instantiating the objects, accept a request from the end user device management system 102 for data values associated with the data value identifiers and respond by providing the data values, accept a request from the end user device management system for deleting an object and respond to the request by deleting the object and accept a request from the end user device management system to close a connection and respond by closing the connection.

In another aspect of the exemplary embodiment, the communication component 106 of the end user device management system 102 provides a communication link between the end user device management system 102 and the end user device 106. Further, in the exemplary embodiment, the communication component 106 can format and send the requests described above toward the end user device, as directed by other components of the end user device management system 102. Continuing with the exemplary embodiment, the communication component 106 can receive the responses from the end user device and provide the responses to other components of the end user device management system 102. It should be noted in the exemplary embodiment that the communication component can also send commands to an end user device allowing the end user device management system 102 to deliver a data model to the end user device 104 by way of communication component 106.

In a further aspect of the exemplary embodiment, the engine component 108 provides the ability to create a series of requests to download the implemented data model and version information from the end user device 104. Continuing with the exemplary embodiment, the engine component 108 passes these requests to the communication component 106 for delivery to the end user device. Next in the exemplary embodiment, the engine component 108 receives the responses from the communication component and processes the responses to prepare a representation of the data model for storage. Further in the exemplary embodiment, the engine component 108 forwards the data model representation to the storage component 110. In another aspect of the exemplary embodiment, the engine component 108 can retrieve an archived data model from the storage component 110 and send the data model towards a specific end user device 104 based on version information obtained from the end user device 104.

In another aspect of the exemplary embodiment, the storage component 110 archives the data model on a storage medium. Continuing with the exemplary embodiment, the storage component 110 can retrieve the data model from the storage medium at the request of the engine component 108.

Figure 2:
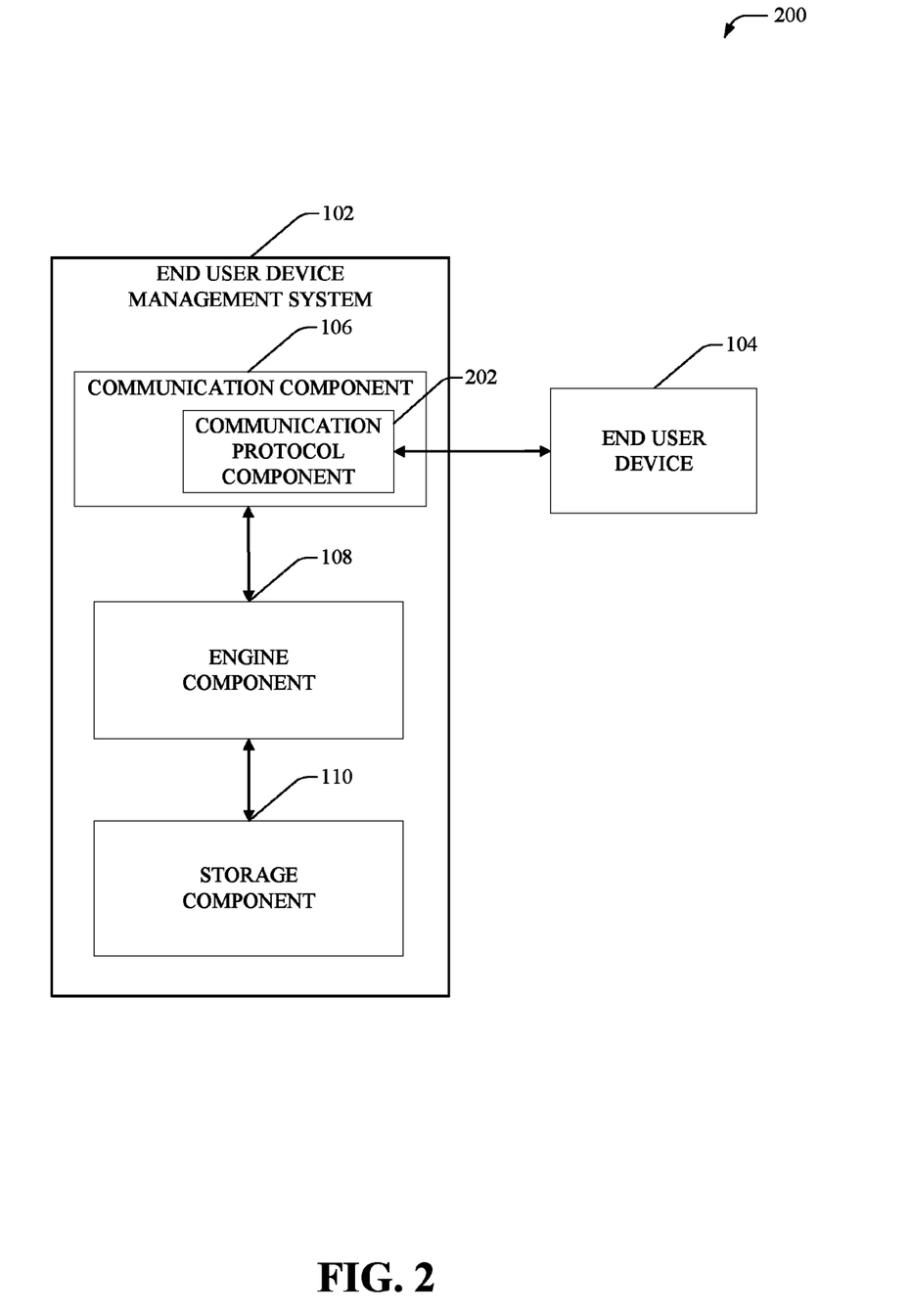
FIG. 2 depicts an end user device management system for downloading data model and version information from an end user device for use in managing other like end user devices, including a communication component, an engine component and a storage component wherein the communication component is facilitated by a communication protocol component.

Looking now to FIG. 2, another exemplary embodiment 200 of an end user device management system 102 connected to an end user device 104 is depicted. Further, exemplary embodiment 200 depicts an end user device management system 102 including a communication protocol component 202. In one aspect of the exemplary embodiment 200 the communication protocol component 202 provides a standard communication interface to manage the interaction with an end user device 104. Continuing with the exemplary embodiment the communication protocol component 202 is defined in the Broadband Forum Technical Report TR-069 and provides capabilities including but not limited to establishing connections with end user devices, requesting a list of supported commands from an end user device 104, requesting a list of parameter names from an end user device 104, requesting an end user device 104 to instantiate an object, requesting a list of parameter names from an end user device 104, requesting parameter values associated with parameter names from an end user device, requesting the end user device 104 to delete specific objects on the end user device 104 and closing the connection to an end user device 104. It should also be noted that other communication protocol components representing other communication protocols including but not limited to Simple Network Management Protocol (SNMP) and Open Mobile Alliance-Device Management (OMA-DM) can be used in other exemplary embodiments.

Figure 3:
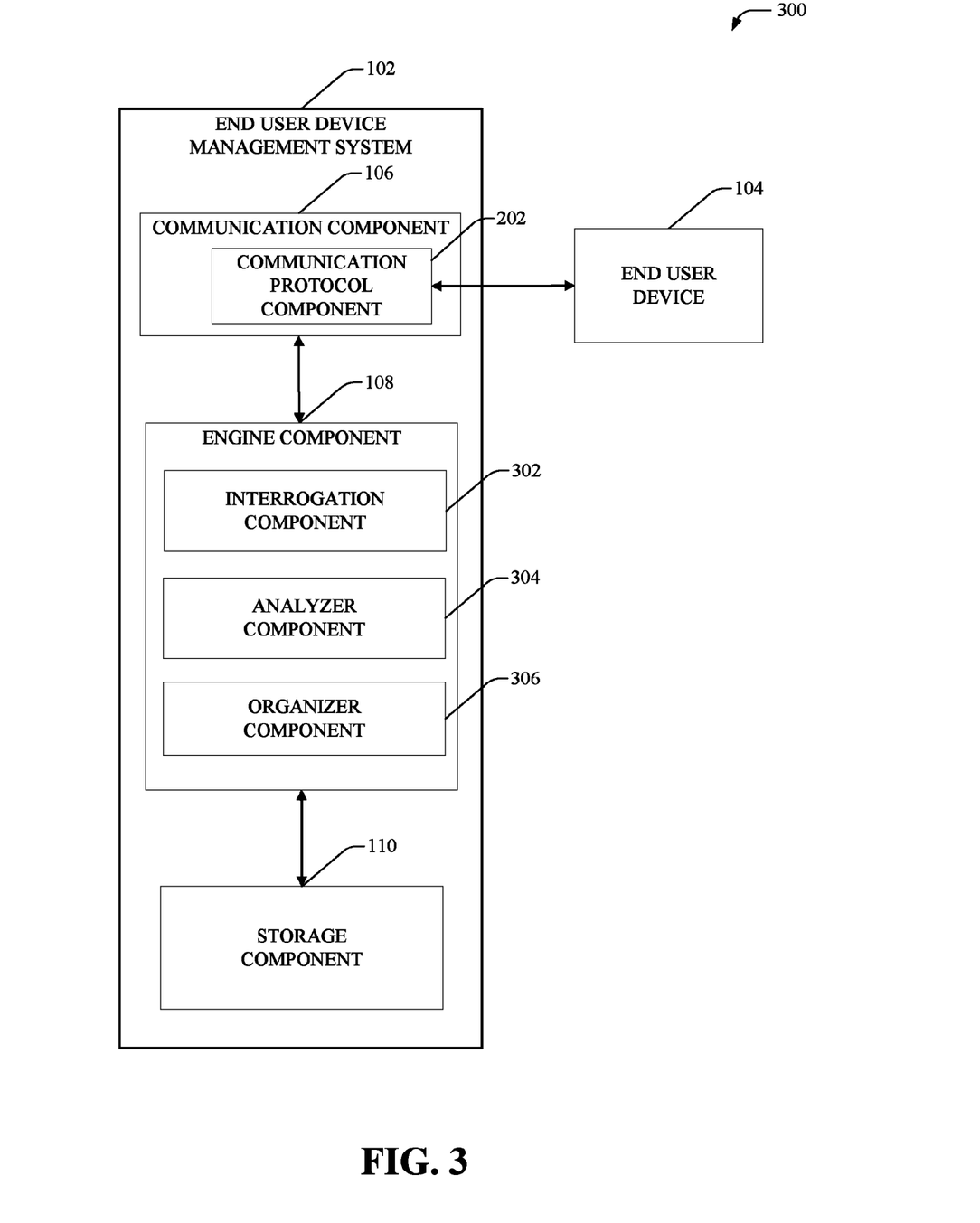
FIG. 3 depicts an end user device management system for downloading data model and version information from an end user device for use in managing other like end user devices, including a communication component, an engine component and a storage component wherein the engine component is facilitated by an interrogation component, an analyzer component and an organizer component.

Turning now to FIG. 3, another exemplary embodiment 300 of an end user device management system 102 connected to an end user device 104 is depicted. Further, exemplary embodiment 300 depicts an end user device management system 102 and its associated engine component 108 including an interrogation component 302, an analyzer component 304 and an organizer component 306. In one aspect of the exemplary embodiment 300, the interrogation component 302 provides the capability to format requests for the communication component 106 to send towards the end user device 104 with regard to collecting information associated with the objects and parameters of the data model implemented in the end user device 104. In another aspect of the exemplary embodiment, the interrogation component can format a request for instantiating an instance of an object that is not yet instantiated but necessary to archiving the implemented data model of the end user device 104.

In another aspect of the exemplary embodiment, the analyzer component 304 provides the capability to evaluate the information returned from requests for parameter names and determine if there are any uninstantiated objects that require instantiation to complete the archiving of the data model implemented in the end user device 104. Continuing with the exemplary embodiment, the analyzer component 304 can generate requests for instantiating the required objects and then generate requests for the parameter names and parameter values associated with the instantiated objects. Further in the exemplary embodiment, the analyzer component 304 determines that the entire data model has been collected from the end user device 104 and provides the data model and the version information, also requested from the end user device 104, to the organizer component for presentation to the storage component 110.

Continuing with the exemplary embodiment, the organizer component 306 provides the capability to collect the objects and parameters associated with the data model implemented on the end user device 104 and identify the data model based on the particular end user device 104 and the version of the software operating the end user device 104. The organized information is then provided to the storage component for archiving and reuse with other end user devices 104 meeting the hardware type and software version requirements. It should be noted that any given data model collected by the end user device management system 102 can be applicable to similar end user devices 104 running different versions of software or similar versions of the software operating on different end user devices 104.

Figure 4:
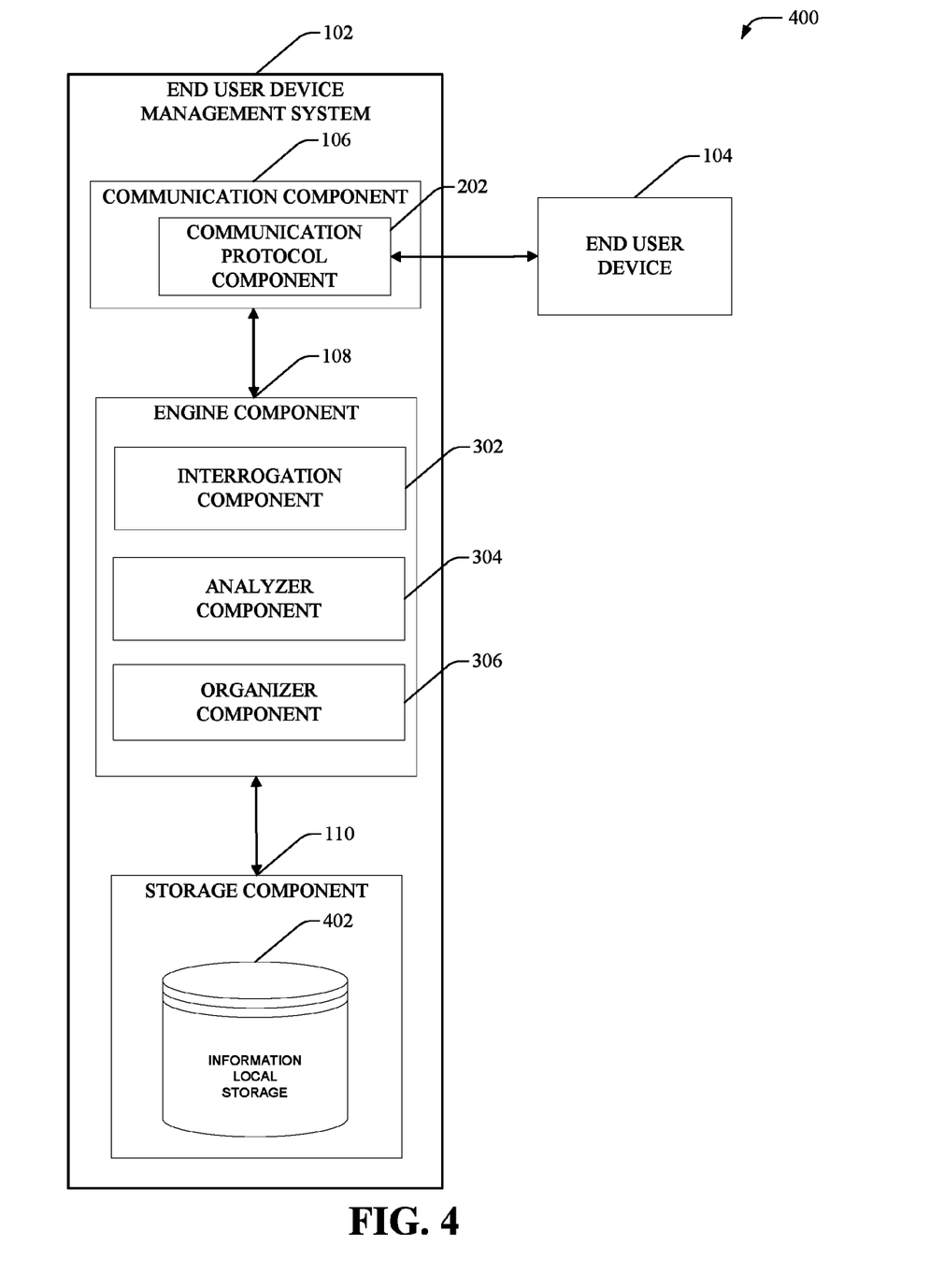
FIG. 4 depicts an end user device management system for downloading data model and version information from an end user device for use in managing other like end user devices, including a communication component, an engine component and a storage component wherein the storage component is facilitated by local data model and version information storage.

Turning now to FIG. 4, another exemplary embodiment 400 of an end user device management system 102 connected to an end user device 104 is depicted. Further, exemplary embodiment 400 depicts an end user device management system 102 and its associated storage component 110 including an information local storage 402 medium. Continuing with the exemplary embodiment, the information local storage 402 medium provides the capability to archive information associated with the data model implemented on the end user device 104 that will persist on the end user device management system 102 through shutdowns and restarts of the end user device management system 102 or other conditions resulting in a restart of the end user device management system 102.

Figure 5:
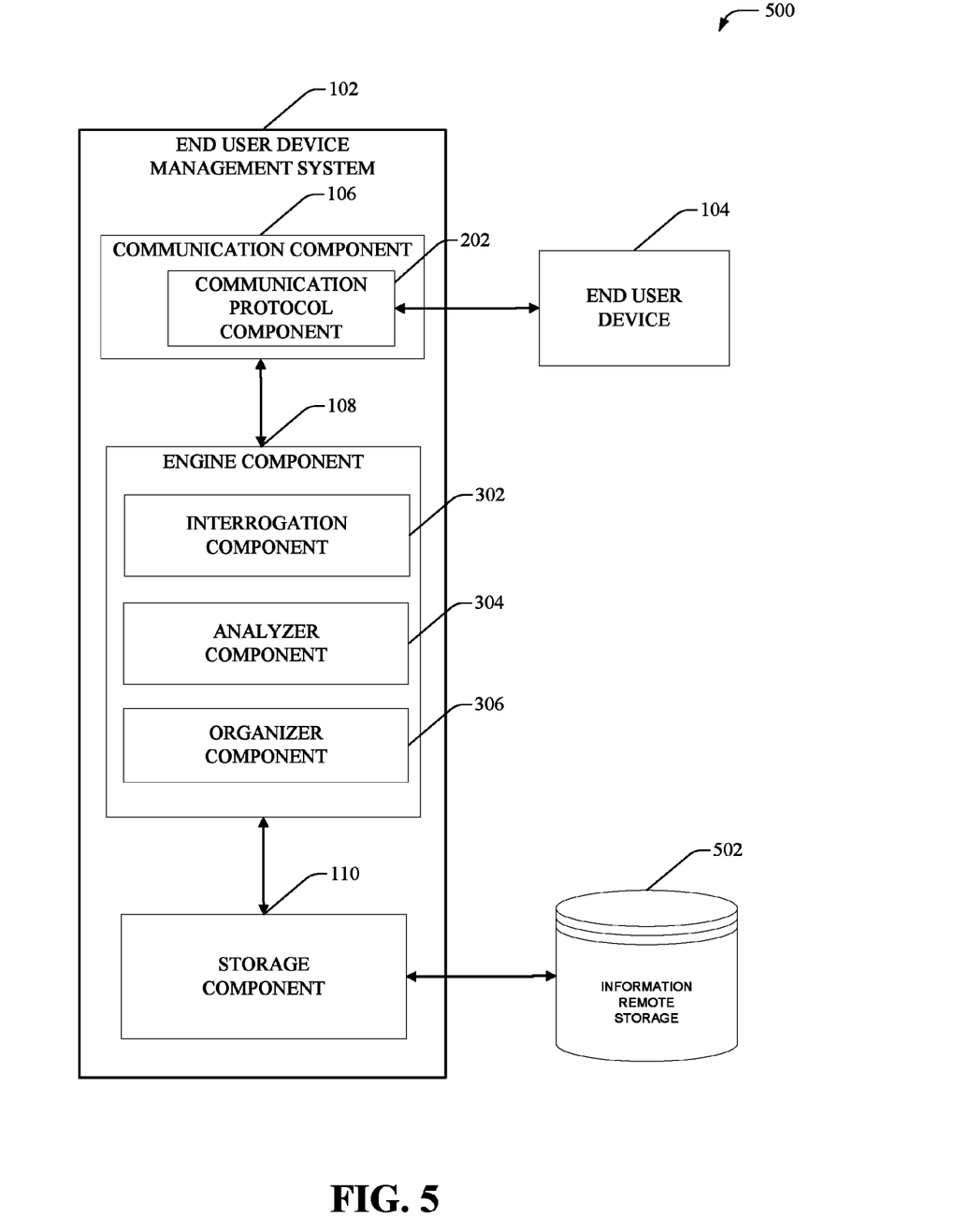
FIG. 5 depicts an end user device management system for downloading data model and version information from an end user device for use in managing other like end user devices, including a communication component, an engine component and a storage component wherein the storage component is facilitated by remote data model and version information storage.

Turning now to FIG. 5, another exemplary embodiment 500 of an end user device management system 102 connected to an end user device 104 is depicted. Further, exemplary embodiment 500 depicts an end user device management system 102 and its associated storage component 110 including a connection to an information remote storage 502 medium. Continuing with the exemplary embodiment, the information remote storage can be on another device, such as a server on a network connected to the end user device management system 102, it can be a network-attached storage (NAS) or any other storage medium accessible to the end user device management system 102. It should also be noted in the exemplary embodiment that the information remote storage 502 can be shared by a plurality of end user device management systems 102.

Figure 6:
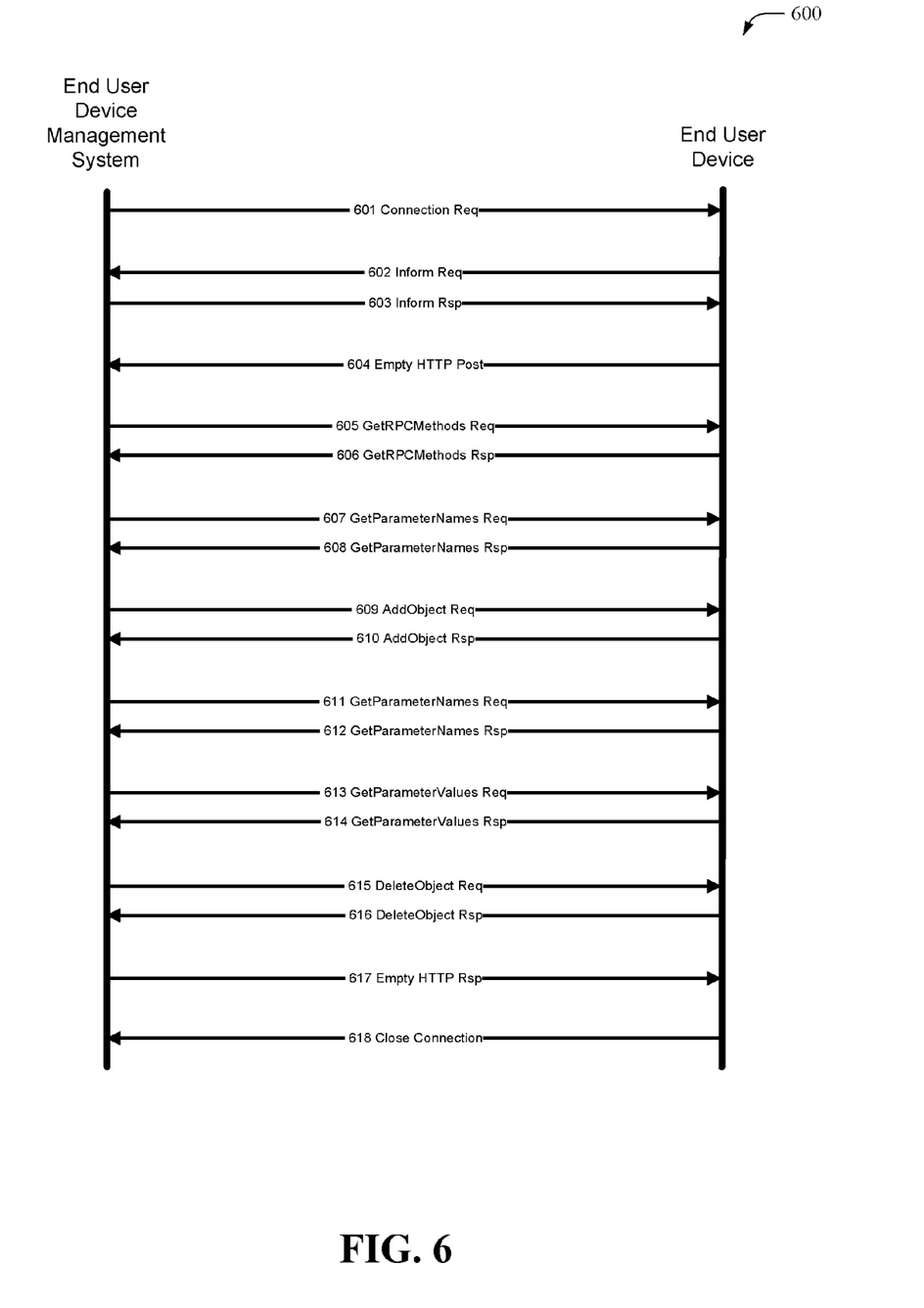
FIG. 6 is a sequence diagram depicting communication protocol requests and responses between an end user device management system and an end user device for opening a connection, requesting and receiving information, and closing the connection.

Turning now to FIG. 6, illustrated is an exemplary embodiment 600. The exemplary embodiment 500 depicts the signaling flow for an end user device management system 102 initiating a connection to an end user device 104 using the TR-069 protocol. First, at exemplary embodiment step 601, the end user device management system 102 sends a connection request to the end user device 104 asking the end user device 104 to contact the end user device management system 102. Next in the exemplary embodiment, at step 602 the end user device 104 contacts the end user device management system 102 by sending an Inform request towards the end user device management system 102. Continuing at step 603 with the exemplary embodiment, the end user device management system 102 sends an inform response toward the end user device 104. Continuing with the exemplary embodiment, at step 604, the end user device 104 indicates it has nothing more to do by sending an empty HTTP Post.

Further in the exemplary embodiment, at step 605, the end user device management system 102 send a GetRPCMethods request command toward the end user device 104 to determine the capabilities of the end user device 104. Continuing with the exemplary embodiment at step 606, the end user device 104 responds with a GetRPCMethods response and a list of all remote procedure call (RPC) methods supported by the end user device 104.

Next in the exemplary embodiment, at step 607 the end user device management system 102 sends a GetParameterNames request command toward the end user device 104. It should be noted that the argument to this RPC is an empty string to indicate that the end user device 104 should return all object and parameter names supported by the end user device 104. It should also be noted that the end user device 104 will also provide information indicating if the objects are instantiable and parameters are writeable. Continuing with the exemplary embodiment, at step 608 the end user device 104 will answer with a GetParameterNames response including all parameter and object names and whether each parameter is writeable and each object is instantiable. Further in the exemplary embodiment, the GetParameterNames response also includes an indication for each object name whether or not the object is instantiated.

Continuing at step 609 of the exemplary environment, for each object that is not instantiated and is instantiable, the end user device management system 102 sends an AddObject request command to the end user device 104. It should be noted in the exemplary embodiment that this allows the method to discover parameters and sub-objects associated with the data model implemented on the end user device 104. Next in the exemplary embodiment, the end user device 104 instantiates an instance of the requested object including all parameters contained in the object. Further in the exemplary embodiment at step 610, the end user device 104 answers with an AddObject response and an instance ID of the instantiated object sent toward the end user device management system 102 which then saves the instance ID of the object for further access. It should be noted in the exemplary embodiment that this sequence of steps, 609-610, is repeated for each object requiring instantiation, including the objects appearing as sub-objects to the instantiated object.

Continuing with the exemplary embodiment, at step 611 the end user device management system 102 sends a GetParameterNames request command using the instance ID returned for the instantiated object toward the end user device 104. Further in the exemplary embodiment, at step 612 the end user device 104 answers with a GetParameterNames response including all the parameters associated with the instantiated object and an indication for each parameter as to whether the parameter is writeable. It should be noted that steps 609-612 are repeated for all instantiable objects, including instantiable objects appearing as sub-objects under an instantiated object. It should also be noted in the exemplary embodiment that as an alternative to steps 609-612, the end user device management system 102 can instantiate all objects on one level and then send a GetParameterNames command on the root level and search for instantiable objects on the next lower level, send an AddObject command for each discovered instantiable object and send another GetParameterNames command on the root level to discover the next lower level instantiable objects. In the exemplary embodiment, this process is repeated until all instantiable objects and writeable parameter names have been discovered.

Continuing with the exemplary embodiment, at step 613 the end user device management system 102 sends a GetParameterValues request for each parameter name to discover the data type of each of the parameters. Further in the exemplary embodiment, the end user device answers at step 614 with a GetParameterValues response that comprises the parameter name, parameter value and the parameter value data type. It should be noted in the exemplary embodiment that the end user device management system 102 stores at least the parameter name and the parameter value data type as a part of the data model. Continuing with the exemplary embodiment, the end user device management system 102 at step 615 sends a DeleteObject request command, including at least the instance ID, for each object instantiated at the request of the end user device management system 102 and at step 616 the end user device answers with a corresponding DeleteObject response. Next, at step 617, the end user device management system 102 sends an empty HTTP response toward the end user device 104 and the end user device 104, at step 618, closes the connection. It should be noted in the exemplary embodiment, that once the steps are completed the end user device management system 102 has collected all parameter names, all multi-instance objects, information associated with each parameter name identifying whether the parameter is writeable and information associated with each parameter identifying the parameters data type.

Figure 7:
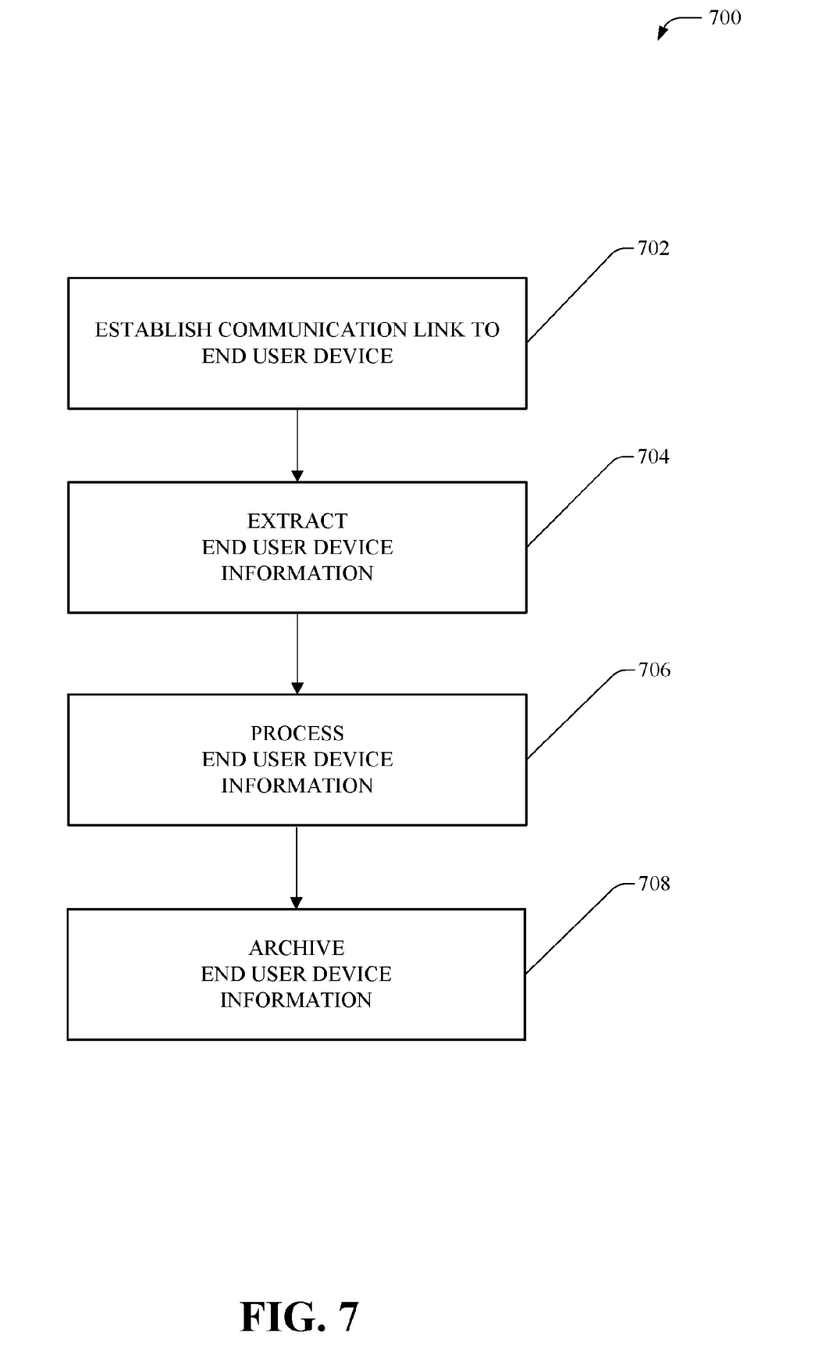
FIG. 7 a flowchart depicting a method for an end user device management system to establish a connection with an end user device, download information associated with the data model implemented on the end user device, process the information and archive the information.

Continuing at FIG. 7, an exemplary method embodiment 700 for collecting and archiving, by an end user device management system 102, the implemented data model and version information from an end user device 104 is depicted. Starting at step 702, the exemplary method embodiment 700, using the communication component 106, establishes a connection with a selected end user device 104. In the exemplary embodiment method 700, the connection is established using the TR-069 protocol component. Continuing with the exemplary embodiment at step 704, the end user device management system 102 downloads the data model and version information from the end user device 104. In the exemplary embodiment, data model information comprises all parameter names, all multi-instance objects, data associated with each parameter name indicating whether the parameter is writeable and data associated with each parameter indicating the data type of the parameter. It should be noted that the data model information is downloaded by a series of requests and responses as described above for FIG. 6.

Next, at step 706, the end user device management system 102 processes the information collected from the end user device 104. In the exemplary embodiment method, the end user device management system 102 interrogates the end user device 104 for all objects that are instantiable but not yet instantiated and instantiates these objects to determine if there are any sub-objects that are instantiable and require further processing. The exemplary embodiment method continues with this method of processing objects and parameters until the complete data model implemented in the end user device 104 has been determined. The exemplary embodiment then combines this information with the version information associated with the end user device and presents this combined information for archiving. At step 708 of the exemplary embodiment, the end user device management system 102 archives the data model and version information to storage device. In the exemplary embodiment, the archived information can be used at a later time to manage a device that is compatible with the version information associated with the data model. In one aspect of the exemplary embodiment, the storage device can be a local storage device associated with the end user device management system 102. In another aspect of the exemplary embodiment, the storage device can be a remote storage device operating independently but communicatively connected to the end user device management system 102 or it can be part of another device including but not limited to a server, providing storage services, on a network accessible by the end user device management system 102.

Figure 8:
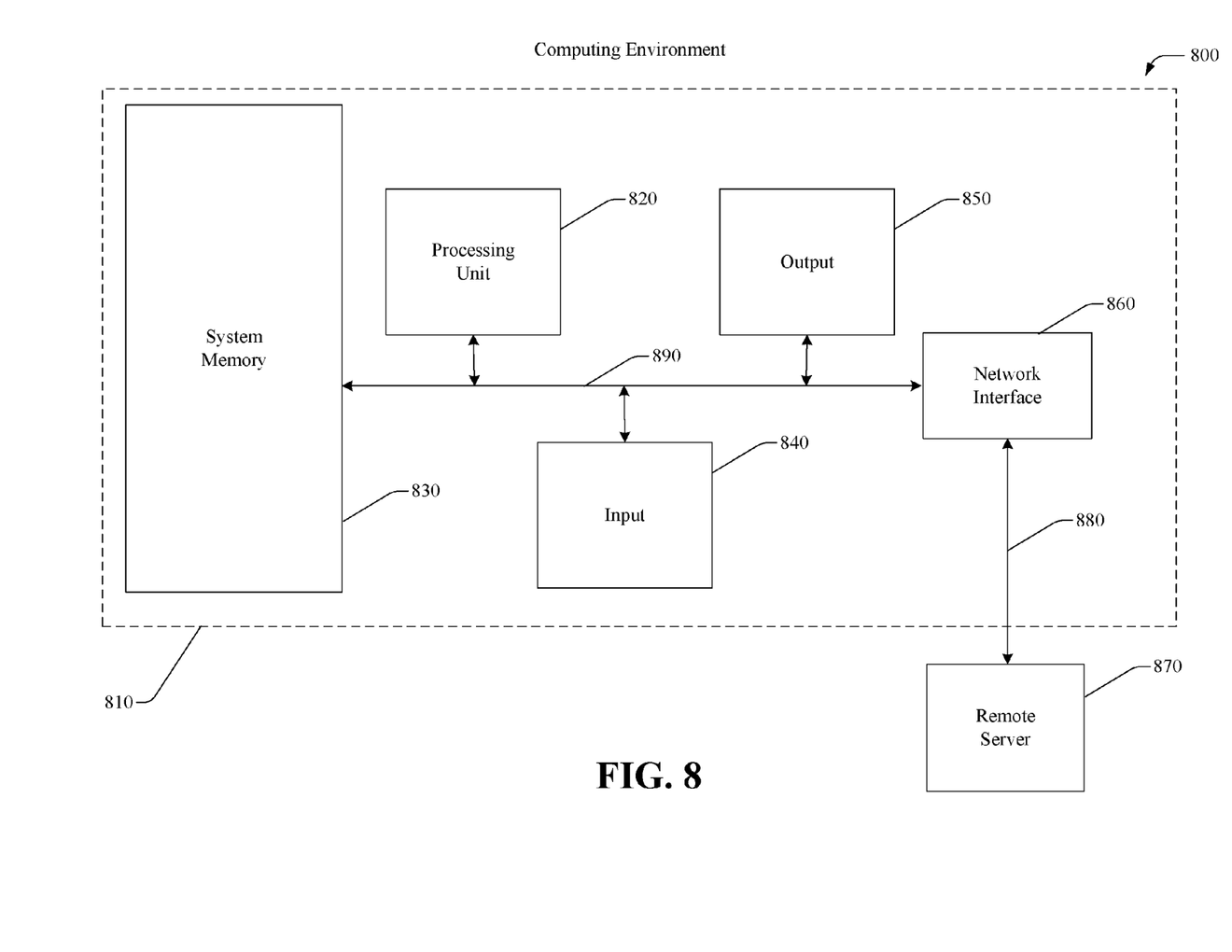
FIG. 8 depicts an exemplary computing device for implementing an end user device management system.

FIG. 8 illustrates an example of a suitable computing system environment 800 in which the claimed subject matter can be implemented, although as made clear above, the computing system environment 800 is only one example of a suitable computing environment for an exemplary embodiment and is not intended to suggest any limitation as to the scope of use or functionality of the claimed subject matter. Further, the computing environment 800 is not intended to suggest any dependency or requirement relating to the claimed subject matter and any one or combination of components illustrated in the example computing environment 800.

Looking now to FIG. 8, an example of a device for implementing the previously described innovation includes a general purpose computing device in the form of a computer 810. Components of computer 810 can include, but are not limited to, a processing unit 820, a system memory 830, and a system bus 890 that couples various system components including the system memory to the processing unit 820. The system bus 890 can be any of several types of bus structures including a memory bus or memory controller, a peripheral bus, and a local bus using any of a variety of bus architectures.

Computer 810 can include a variety of computer readable media. Computer readable media can be any available media that can be accessed by computer 810. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media can embody computer readable instructions, data structures, program modules or other data in a modulated data signal such as a carrier wave or other transport mechanism and can include any suitable information delivery media.

The system memory 830 can include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, can be stored in memory 830. Memory 830 can also contain data and/or program modules that are immediately accessible to and/or presently being operated on by processing unit 820. By way of non-limiting example, memory 830 can also include an operating system, application programs, other program modules, and program data.

The computer 810 can also include other removable/non-removable and volatile/nonvolatile computer storage media. For example, computer 810 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 890 through a non-removable memory interface such as an interface, and a magnetic disk drive or optical disk drive can be connected to the system bus 890 by a removable memory interface, such as an interface.

A user can enter commands and information into the computer 810 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 820 through user input 840 and associated interface(s) that are coupled to the system bus 890, but can be connected by other interface and bus structures, such as a parallel port, game port or a universal serial bus (USB).

A graphics subsystem can also be connected to the system bus 890. In addition, a monitor or other type of display device can be connected to the system bus 890 through an interface, such as output interface 850, which can in turn communicate with video memory. In addition to a monitor, computers can also include other peripheral output devices, such as speakers and/or printing devices, which can also be connected through output interface 850.

The computer 810 can operate in a networked or distributed environment using logical connections to one or more other remote computers, such as remote server 870, which can in turn have media capabilities different from device 810. The remote server 870 can be a personal computer, a server, a router, a network PC, a peer device or other common network node, and/or any other remote media consumption or transmission device, and can include any or all of the elements described above relative to the computer 810. The logical connections depicted in FIG. 8 include a network 880, such as a local area network (LAN) or a wide area network (WAN), but can also include other networks/buses.

When used in a LAN networking environment, the computer 810 is connected to the LAN 880 through a network interface or adapter. When used in a WAN networking environment, the computer 810 can include a communications component, such as a modem, or other means for establishing communications over a WAN, such as the Internet. A communications component, such as a modem, which can be internal or external, can be connected to the system bus 890 through the user input interface at input 840 and/or other appropriate mechanism.

In a networked environment, program modules depicted relative to the computer 810, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations captured from events and/or data. Captured events and data can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method of obtaining a data model associated with an end user device for managing said end user device, said method comprising:
   establishing, by an end user device management system, a communication link with said end user device using a communication protocol associated with said data model, wherein said end user device implements said data model;
   extracting, by said end user device management system, objects and parameters associated with said data model and version information associated with said end user device, from said end user device;
   processing, by said end user device management system, said objects and said parameters; and
   storing, by said end user device management system, said objects, said parameters and said version information
   wherein said extracting further comprises:
      requesting, by said end user device management system, a connection to said end user device;
      requesting, by said end user device management system, a list of remote procedure calls (RPCs) supported by said end user device;
      receiving the list of remote procedure calls supported by said end user device; and
      requesting, by said end user device management system, a list of objects and parameters associated with said end user device using any of said supported remote procedure calls;
   wherein said communication protocol is a Broadband Forum protocol and said requesting the list of remote procedure calls uses a GetRPCMethods command;
   wherein said parameters include a parameter data type and information associated with whether a parameter is writeable;
   further wherein said communication protocol is Broadband Forum Technical Report-069 (TR-069), the method further comprising:
      using a TR-069 getParameterValues command to obtain said parameter data type, and using a TR-069 getParameterNames command to obtain said information associated with whether said parameter is writeable.

2. The method of claim 1, wherein said objects include an indication of whether additional instances of said objects may be instantiated.

3. The method of claim 1, the method further comprising: using a TR-069 getParameterNames command to obtain said indication of whether additional instances of said objects may be instantiated.

4. The method of claim 1, wherein said step of extracting further comprises: instantiating an object in said end user device; and extracting further object information from said instantiated object.

5. The method of claim 4, wherein the step of instantiating an object is performed using a TR-069 addObject command.

6. The method of claim 1, wherein said requesting a connection uses a Hypertext Transfer Protocol (HTTP) GET command to an HTTP Universal Resource Locator (URL).

7. The method of claim 1, wherein said storing further comprises archiving, by said end user device management system, said objects, said parameters and said version information on a local storage medium.

8. The method of claim 1, wherein said storing further comprises sending, by said end user device management system, said objects, said parameters and said version information towards a remote storage medium.

9. An apparatus for managing data models associated with a plurality of end user devices, said apparatus comprising:
   a communication component configured for communicating with said plurality of end user devices;
   an engine component configured for collecting, from said plurality of end user devices, information associated with managing said data models and organizing said information; and
   a storage component configured for storing said information for reuse;
   wherein said communication component further comprises a communication protocol component wherein said communication protocol defines a data model associated with said end user device, said communication protocol being one of Broadband Forum Technical Report-069 (TR-069), Open Mobile Alliance-Device Management (OMA-DM) and Simple Network Management Protocol (SNMP),
   wherein said engine component further comprises:
   an interrogation component configured to determine which objects are uninstantiated,
   wherein said information further comprises:
   objects associated with said data models;
   parameters associated with said data models; and
   version data associated with said plurality of end user devices, further wherein said apparatus is implemented in at least one computing device, and said at least one computing device comprises at least one processor and at least one memory.

10. The apparatus of claim 9, wherein said engine component further comprises:
   an analyzer component configured for determining which objects are instantiable and which parameters are writeable.

11. The apparatus of claim 10, wherein said communication protocol is TR-069 and wherein said analyzer component is configured to determine which objects are instantiable using getParameterValues commands and which parameters are writeable using getParameterNames commands.

12. The apparatus of claim 9, wherein said communication protocol is TR-069 and wherein said interrogation component determines which objects are uninstantiated using getParameterNames commands.

13. The apparatus of claim 9, wherein said interrogation component is configured to instantiate said uninstantiated objects.

14. The apparatus of claim 9, wherein said communication protocol is TR-069 and wherein said interrogation component instantiates said uninstantiated objects using an addObject command.

15. The apparatus of claim 9, wherein said engine component further comprises: an organizer component configured for preparing said information for storage by said storage component.

* * * * *